United States Patent
Osada

[19]

[11] Patent Number: 5,927,850

[45] Date of Patent: Jul. 27, 1999

[54] STOPLIGHT FOR VEHICLE

[75] Inventor: Kazuhiro Osada, Nagoya, Japan

[73] Assignee: Aisin Seiki Kabushiki Kaisha, Kariya, Japan

[21] Appl. No.: 08/577,538

[22] Filed: Dec. 22, 1995

[30] Foreign Application Priority Data

Dec. 26, 1994 [JP] Japan .................................. 6-323108

[51] Int. Cl.⁶ ...................................................... F21V 8/00
[52] U.S. Cl. ........................... 362/554; 362/556; 362/582; 385/901
[58] Field of Search ...................... 362/552, 554, 362/556, 558, 582; 385/126, 45, 901

[56] References Cited

U.S. PATENT DOCUMENTS

| 5,134,672 | 7/1992 | Imoto et al. | 385/45 |
| 5,222,794 | 6/1993 | Windross | 362/554 |

FOREIGN PATENT DOCUMENTS

| 58-11917 | 1/1983 | Japan . |
| 59-114513 | 7/1984 | Japan . |
| 61-55611 | 3/1986 | Japan . |
| 63-118003 | 7/1988 | Japan . |
| 2-10502 | 1/1990 | Japan . |
| 4-134402 | 5/1992 | Japan . |
| 4-307328 | 10/1992 | Japan . |
| 4-325332 | 11/1992 | Japan . |
| 4-325333 | 11/1992 | Japan . |

*Primary Examiner*—Y. Quach
*Attorney, Agent, or Firm*—Burns, Doane, Swecker & Mathis, LLP

[57] ABSTRACT

A stoplight for a vehicle includes a light source, a core portion formed of a transparent material and an integral cladding portion formed of a material having a refractive index which is smaller than that of the core portion. The core portion includes a bundle portion which is connected to the light source and a plurality of branch portions which diverge from the bundle portion. The cladding portion covers the core portion.

7 Claims, 4 Drawing Sheets

STOPLIGHT FOR VEHICLE

FIELD OF THE INVENTION

This invention relates to a stoplight for a vehicle and more particularly to a high mounted stoplight for a vehicle.

BACKGROUND OF THE INVENTION

A conventional stoplight for a vehicle is disclosed in Japanese Patent Laid-open Publication No. 4 (1992)-325333. The vehicle stoplight disclosed in this document includes a lamp and a plurality of optical fibers which are independent of each other. Each of the optical fibers includes a core and a cladding which covers the core. The cladding has a refractive index which is smaller than that of the core.

The above conventional stoplight for a vehicle suffers from the disadvantage that it is costly to manufacture since each of the cores must be covered with the cladding. Also, the manufacturing process is somewhat time-consuming and lacks simplicity in structure.

SUMMARY OF THE PRESENT INVENTION

In view of the foregoing, a need exists for a vehicle stoplight which is low in cost to manufacture.

It would also be desirable to provide a stoplight for a vehicle which can be manufactured in a relatively simple manner.

A need also exists for a vehicle stoplight which is simple in structure and small in size.

It would be further desirable to provide a stoplight for a vehicle which is durable.

To address the foregoing, a stoplight for a vehicle in accordance with one aspect of the present invention includes a light source, a core portion formed of a transparent material and a cladding portion. The core portion includes a bundle portion which is connected to the light source and a plurality of branch portions which diverge from the bundle portion. The integral cladding portion is formed of a material having a refractive index which is smaller than that of the core portion, with the cladding portion covering the core portion.

The vehicle stoplight in accordance with another aspect of the present invention includes a light source, a core portion formed of a transparent material and including a plurality of spaced apart branch portions connected to the light source, and a cladding portion having a lower portion and an upper portion. The branch portions are integrally formed with either the lower portion of the cladding portion or the upper portion of the cladding portion, with the other of the lower portion and the upper portion being provided with a plurality of spaced apart recesses which receive the spaced apart branch portions to fit the lower portion of the cladding portion and the upper portion of the cladding to one another.

In accordance with another aspect of the present invention a method of manufacturing a lighting member for a vehicle stoplight includes molding a lower portion of a cladding portion from synthetic resin having a first refractive index, molding onto the lower portion a core portion from transparent synthetic resin having a refractive index larger than the first refractive index, molding an upper portion of the cladding portion from synthetic resin so that the upper portion of the cladding portion possesses a recessed portion, and connecting the lower portion of the cladding portion and the upper portion of the cladding portion by fitting the core portion into the recessed portion of the upper portion of the cladding portion.

BRIEF DESCRIPTION OF THE DRAWING FIGURES

The features and advantages of the vehicle stoplight according to the present invention will be more clearly appreciated from the following description considered in conjunction with the accompanying drawing figures in which like elements bear like reference numerals and wherein.

DETAILED DESCRIPTION OF PREFERRED EMBODIMENT OF THE INVENTION

Figure 1:
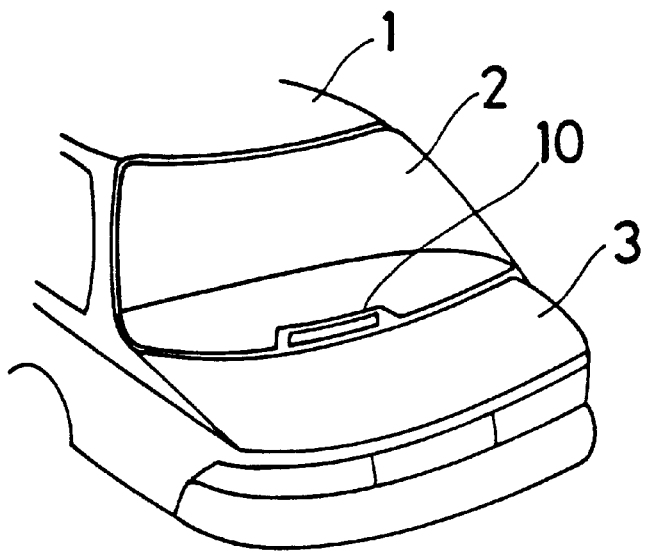
FIG. 1 is a schematic view showing a rear portion of a vehicle on which a stoplight for a vehicle of the present invention is mounted.

With reference to FIG. 1, a high mounted stoplight 10 is mounted on an inner side of a rear window 2 of a vehicle. The vehicle includes a vehicle body 1 and a trunk 3. The high mounted stoplight 10 may alternatively be mounted in a rear deflector (not shown in the drawing). Further, the high mounted stoplight 10 can be mounted on the inner side of the rear window 2 so as to surround the rear window 2.

Figure 2:
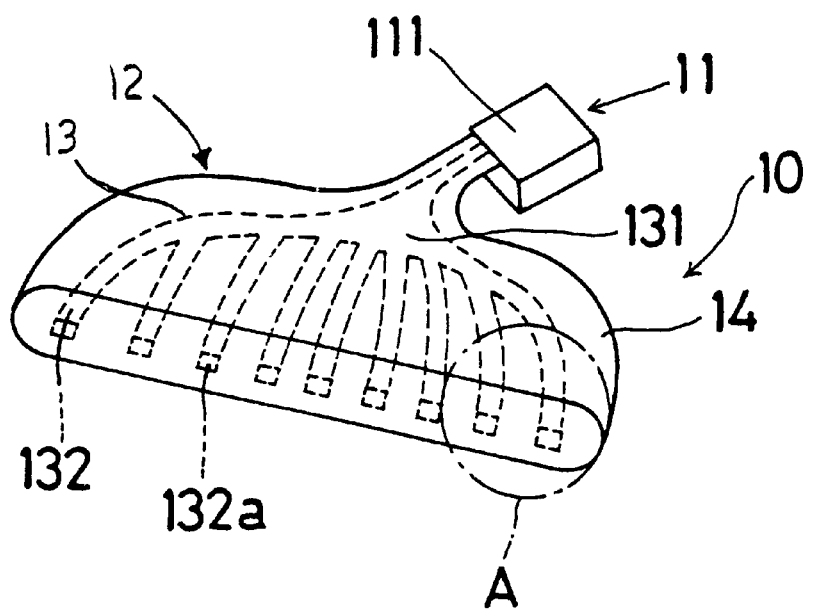
FIG. 2 is a perspective view of a stoplight for a vehicle of the present invention.
Figure 3:
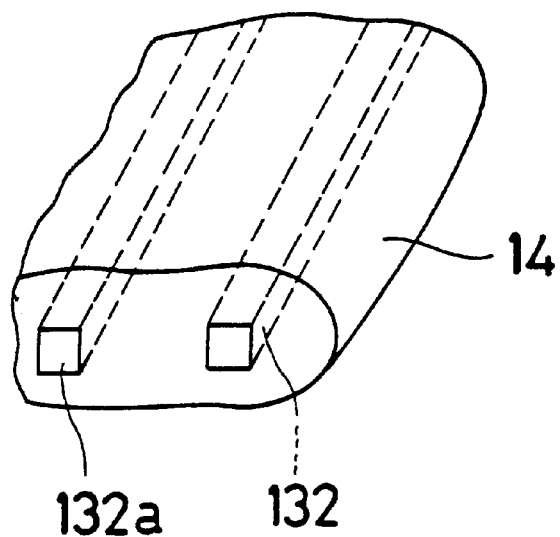
FIG. 3 is an enlarged detailed view of a portion of the stoplight shown in FIG. 2.

With reference to FIG. 2, the high mounted stoplight 10 includes a light source 11 and a stoplight body 12 as a lighting member. The light source 11 includes a lamp housing 111 formed of synthetic resin and a lamp (not specifically shown in the figures) disposed in the lamp housing 111. The stoplight body 12 includes a core portion 13 and an integral cladding portion 14.

The core portion 13 is formed with a bundle portion 131 and a plurality of branch portions 132 that extend or diverge from the bundle portion 131. The bundle portion 131 is connected to the light source 11 and a lighting portion 132a is located at the end of each of the branch portions 132.

The core portion 13 is formed of a transparent material having a relatively large refractive index. Polycarbonate resin (which has a refractive index of 1.58), polyarylate resin (which has a refractive index of 1.61), polystyrene resin (which has a refractive index of 1.59) and other like materials can be used for forming the core portion 13 of a transparent synthetic resin. Further, the core portion 13 can be formed of glass having a relatively large refractive index (i.e., 1.59) and other like materials (which may be other than synthetic resins).

The cladding portion 14 covers all of the core portion 13. The cladding portion 14 is formed of a material having a refractive index which is smaller than that of the core portion 13. In this regard, polymethacrylate resin (which has a refractive index of 1.49), silicone resin (which has a refractive index of 1.41), acrylic resin containing fluorine (which has a refractive index of 1.42) and the like can be used for forming the cladding portion 14. Further, the cladding portion 14 can be formed of quartz glass (which has a refractive index of 1.46) and other like materials (which may be other than synthetic resins).

The operation of the high mounted stoplight 10 will be described hereinafter. When the driver of the vehicle operates the vehicle brake (not shown in the drawing figures), a brake switch (not shown in the drawing figures) is closed in order to supply electric power to the light source 11. Therefore, the lamp of the light source 11 turns on.

Since the core portion 13 has a refractive index which is larger than that of the cladding portion 14, light emitted from the lamp of the light source 11 is transmitted to each of the lighting portions 132a through the bundle portion 131 and each of the branch portions 132 because of the total reflection of the light. Therefore, the high mounted stoplight 10 emits light from the lighting portions 132a.

Figure 4:
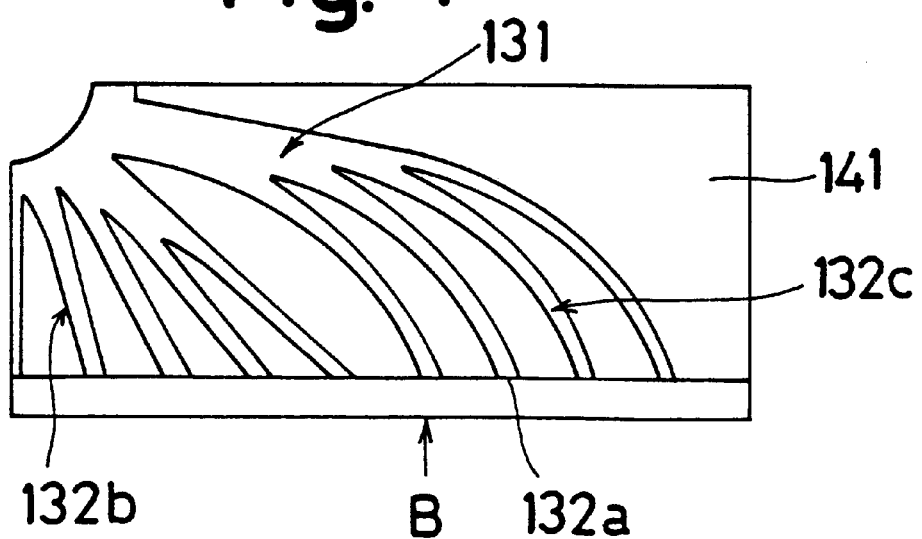
FIG. 4 is a plan view showing the lower portion of the cladding portion with the integrally formed core portion of the vehicle stoplight according to the present invention.
Figure 5:
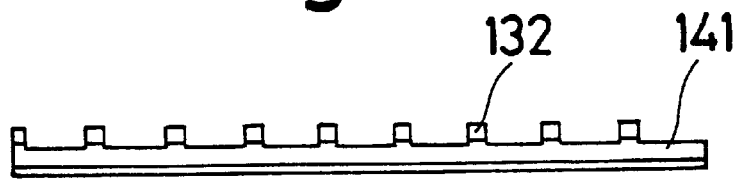
FIG. 5 is an elevational view of the lower portion of the cladding portion taken in the direction of arrow B in FIG. 4.

With reference to FIGS. 4–7, a right side portion of the cladding portion 14 is shown. The cladding portion 14 is formed with a lower portion 141 and an upper portion 142. The core portion defined by the bundle portion 131 and branch portions 132 is disposed on the lower portion 141 of the cladding portion 14 so that the core portion projects upwardly from the lower portion 141 as shown in FIG. 5. The branch portions 132 are arranged to provide an even or substantially even distance between adjacent lighting portions 132a.

The branch portions 132 are formed into three groups—namely a straight line group 132b of branch portions comprised of nine branch portions 132 (only five of the branch portions 132 of the straight line group are shown in FIG. 4), a right side curved line group 132c of branch portions comprised of four branch portions 132, and a left side curved line group (not specifically shown in the drawing figures) which can also be comprised of four branch portions. The branch portions 132 in the left side curved line group are similar to the branch portions 132 in the right side curved line group. The branch portions 132 of the straight line group 132b are straight or substantially straight while the branch portions 132 of the right and left side curved line groups are curved.

The straight line group 132b is located at the center of the cladding portion 14 and is formed in a radial shaped configuration extending from the light source 11. The right side curved line group 132c is located on the right side of the straight line group 132b. Each of the branch portions 132 included in the right side curved line group 132c is curved with a predetermined curvature (which is a minimum radius designed to avoid having the light leak out from the branch portion 132). Further, the left side curved line group is located on the left side of the straight line group 132b. Each of the branch portions 132 included in the left side curved line group is curved with a curvature that is equal to or substantially equal to that of the branch portions 132 in the right side curved line group 132c (which is once again the minimum radius which will avoid leakage of light out of the branch portion 132).

In accordance with the above structure, because the branch portions 132 are divided into a straight line group 132b located at the center of the cladding portion 14 and a pair of curved line groups each of which is located adjacent to and on one side of the straight line group 132b, the lighting portions 132a are easily located to equalize the distances between the lighting portions 132a with respect to each other.

Figure 6:
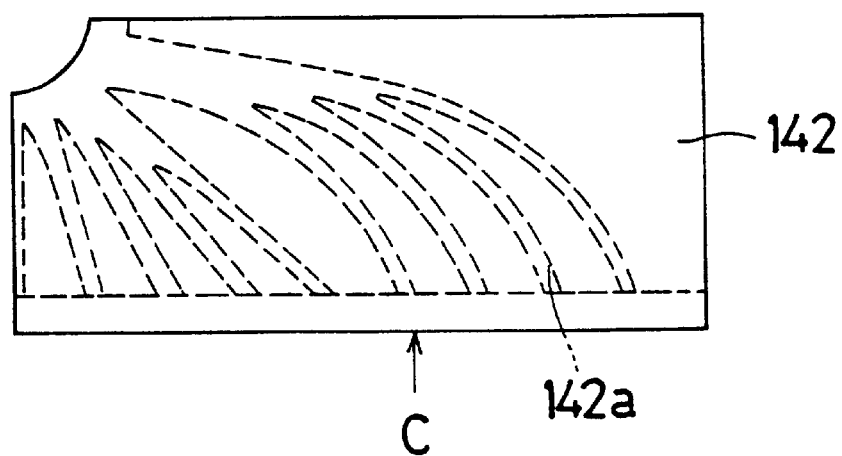
FIG. 6 is a plan view of the upper portion of the cladding portion of the vehicle stoplight according to the present invention.
Figure 7:
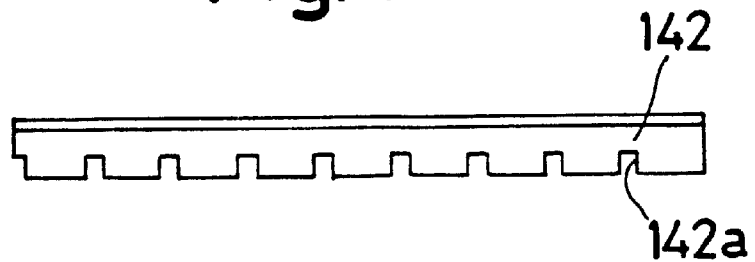
FIG. 7 is an elevational view of the upper portion of the cladding portion of the vehicle stoplight according to the present invention taken in the direction of arrow C in FIG. 6.

As shown in FIGS. 6 and 7, the upper portion 142 of the cladding portion 14 includes a concave or recessed portion 142a which can be fitted with the core portion 13.

Figure 8:
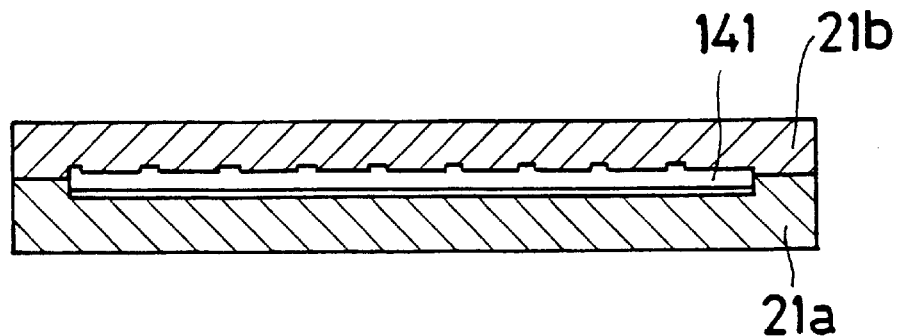
FIG. 8 is a cross-sectional view of a mold for molding the lower portion of the cladding portion.
Figure 9:
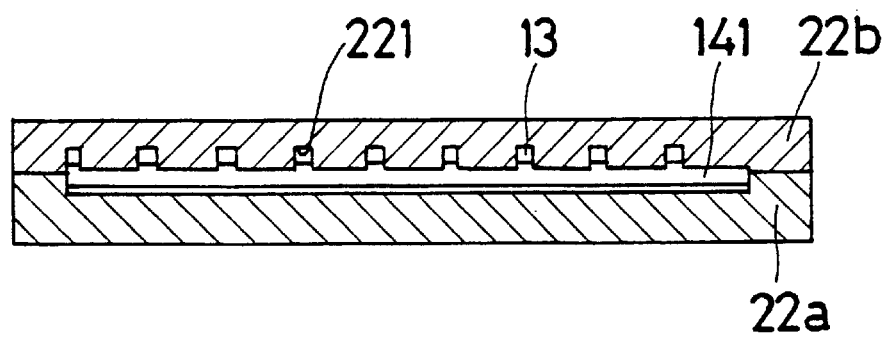
FIG. 9 is a cross-sectional view of a mold for molding the core portion.
Figure 10:
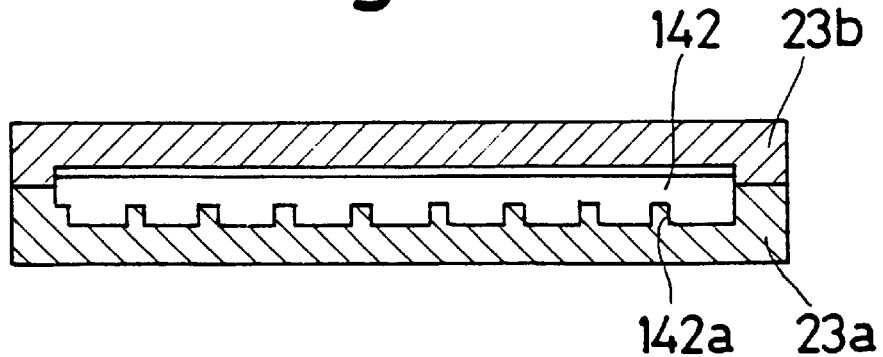
FIG. 10 is a cross-sectional view of a mold for molding the lower portion of the cladding portion.

With reference to FIGS. 8–10, a manufacturing process of the stoplight body 12 will be described hereinafter. First, melted synthetic resin having a relatively small refractive index is poured into a cavity formed by a pair of lower side molds 21a, 21b shown in FIG. 8. The cavity possesses a shape that corresponds to the lower portion 141 of the cladding portion 14. The synthetic resin is then cooled in order to form the lower portion 141 of the cladding portion Id.

Thereafter, the lower portion 141 of the cladding portion 14 is set in a pair of core forming molds 22a, 22b with a cavity 221 being provided between the lower portion 141 and the core forming mold 22b. Melted transparent synthetic resin having a relatively large refractive index is then poured into the cavity 221 between the core forming mold 22b and the lower portion 141 of the cladding portion 14 shown in FIG. 9. Thereafter, the transparent synthetic resin is cooled to form the core portion 13 on the lower portion 141.

The mold shown in FIG. 10 is then used to fabricate the upper portion 142 of the cladding portion 14. In this regard, melted synthetic resin, which can be the same as that used to make the lower portion 141, is poured into a cavity formed by a pair of upper side molds 23a, 23b shown in FIG. 10. The cavity defined by the upper side molds 23a, 23b possesses a shape which corresponds to the shape of the upper portion 142 of the cladding portion 14 in which the upper portion 142 includes recessed portions 142a for receiving the branch portions 132 of the core portion 13. Later, the synthetic resin is cooled to form the upper portion 142 of the cladding portion 14.

Then, the lower portion 141 of the cladding portion 14 with the integrally formed core portion 13 is connected with the upper portion 142 of the cladding portion 14 by fitting the core portion 13 into the concave portion 142a. That is, the branch portions 132 are fitted into the recessed portions 142a. Consequently, the stoplight body 12 is completed. In accordance with the above-described methodology, the synthetic resins may be injected into the molds.

When the stoplight body 12 includes an integral cladding portion 14 (which is not divided into the lower portion 141 and the upper portion 142), the stoplight body 12 can be formed as follows. The core portion 13 is molded by the injection molding. Later, the cladding portion 14 is molded by injection molding to cover the core portion 13.

In accordance with the above structure, since the single integral cladding portion 14 covers all of the branch portions 132 of the core portion 13, the cladding portion 14 can be formed at one time. Therefore, the manufacturing time and the manufacturing cost can be reduced since each branch portion need not be separately covered.

Further, since the lighting portions 132a are arranged so that equal or substantially equal distances exist between adjacent lighting portions 132a, the stoplight body 12 can emit light evenly in the horizontal direction.

Furthermore, because the branch portions 132 are formed with a straight line group 132b located at the center of the cladding portion 14 and a pair of curved line groups each located on one side of and adjacent to the straight line group 132b, the lighting portions 132a are easily located to even or equalize the distances between the lighting portions 132a.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A vehicle stoplight comprising:

a light source;

a core portion formed of a transparent material and including a plurality of spaced apart branch portions which receive light from the light source;

a cladding portion having a lower portion and an upper portion, said branch portions being integrally formed with at least one of the lower portion of the cladding portion and the upper portion of the cladding portion, the other of said lower portion and upper portion being provided with a plurality of spaced apart recesses which receive the spaced apart branch portions to fit the lower portion of the cladding portion and the upper portion of the cladding portion to one another.

2. A vehicle stoplight as recited in claim 1, wherein said cladding portion is made of a material having a refractive index that is less than the refractive index of the material from which said core portion is made.

3. A vehicle stoplight as recited in claim 2, wherein the branch portions each have an end at which is disposed a lighting portion.

4. A vehicle stoplight as recited in claim 1, including a plurality of lighting portions each disposed at an end of one of the branch portions.

5. A vehicle stoplight as recited in claim 4, wherein adjacent ones of said lighting portions are spaced apart equal distances from one another.

6. A vehicle stoplight as recited in claim 1, wherein said branch portions diverge from a bundle portion that is connected to the light source.

7. A stoplight for a vehicle as recited in claim 1, wherein the branch portions are comprised of a straight line group of branch portions located at the center of the cladding portion and at least one curved line group of branch portions located on one side of the straight line group of branch portions, said branch portions of the straight line group being substantially straight and the branch portions of the at least one curved line group being curved.

* * * * *